United States Patent [19]

Tessarzik et al.

[11] Patent Number: 4,495,810

[45] Date of Patent: Jan. 29, 1985

[54] PROBE MOUNTING SYSTEM

[75] Inventors: Juergen M. Tessarzik, Schoharie; Albert Myers, Amsterdam; James D. Yuille, Schenectady, all of N.Y.

[73] Assignee: General Electric Co., Schenectady, N.Y.

[21] Appl. No.: 486,786

[22] Filed: Apr. 20, 1983

[51] Int. Cl.³ .......................................... G01M 13/00
[52] U.S. Cl. .................... 73/432 R; 73/660; 73/661; 324/208
[58] Field of Search ............... 73/660, 661, 432 R, 73/432 B; 324/207, 208

[56] References Cited

U.S. PATENT DOCUMENTS

| | | | |
|---|---|---|---|
| 3,835,696 | 9/1974 | Amberger et al. | 73/661 |
| 4,018,083 | 4/1977 | Hoffman | 73/661 |
| 4,164,864 | 8/1979 | Feller | 324/207 |

Primary Examiner—S. Clement Swisher
Attorney, Agent, or Firm—J. C. Squillaro

[57] ABSTRACT

A sensor probe is affixed at an end of a probe adapter which includes an extended portion which is radially flexible but torsionally stiff. A guideway which passes from an accessible location in a machine to the vicinity or the target surface guides the sensor probe to its operative location. Final positioning of the sensor probe is attained by abutment of a forward shoulder on the probe adapter with an abutment shoulder fixed to the machine a predetermined distance from the target surface to be monitored. This permits removal and replacement of sensor probes without requiring final adjustment of the replacement sensor probe. One embodiment of the invention permits final adjustment and locking of the sensor probe in position after full assembly of the bearing housing by providing a star wheel on an adjustment sleeve which, after adjustment is locked in position by a setscrew.

23 Claims, 8 Drawing Figures

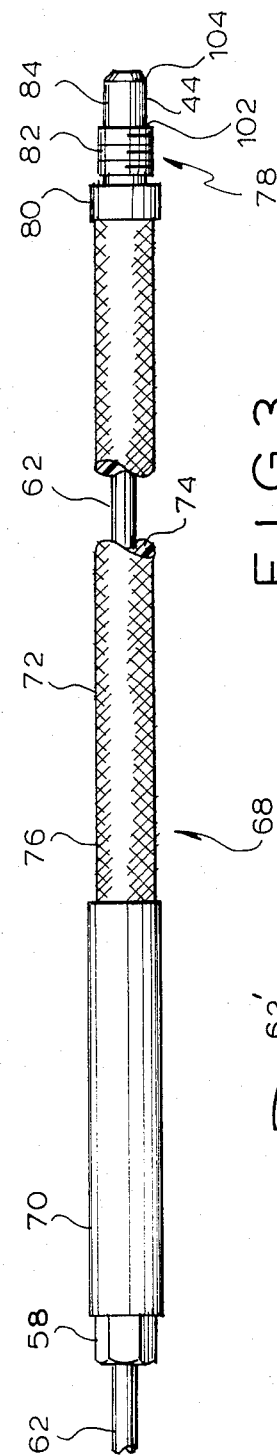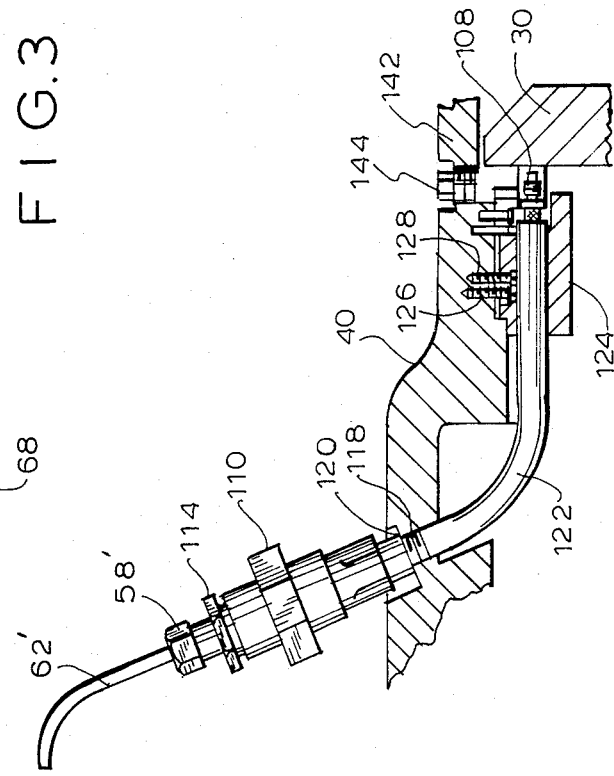

PROBE MOUNTING SYSTEM

BACKGROUND OF THE INVENTION

The present invention relates to measurements in machinery and, more particularly, to measurement of proximity of one element in a machine apparatus to another without actually touching one of the elements.

Proximity probes, for example, are commonly used in machinery for determining the condition of the machinery and transmitting signals related thereto to indicating or recording apparatus remote from the point of measurement. The remote feature has considerable importance in apparatus such as, for example, pumps, motors and axial compressors where access to the area to be measured is unavailable except pursuant to a substantial disassembly of the apparatus. If a proximity probe fails, either due to damage during manufacturing or during its operating life, the purpose for inclusion of such a proximity probe is defeated since disassembly is required to determine the condition of the machinery as well as to replace the failed proximity probe. Although many different types of apparatus are users of proximity measurement probes and the present invention is equally related thereto, a specific example of a large heavy duty gas turbine is employed for concreteness of description. The background problems in other types of apparatus are similar to the example given and further description of such apparatus is omitted.

In a large gas turbine, it is important to monitor the radial vibration of the rotor in its journal bearings to detect levels of radial vibration which may provide an indication of bearing damage or of equipment malfunction which may be related to excessive imbalance in the rotating equipment. Typically, when a rotor journal is vibrated due to imbalance, its center describes a circular or elliptical orbit. It has thus been customary to position a pair of proximity sensors spaced ninety degrees apart with their axis oriented radially to detect the journal motion along orthogonal axis. The types of sensors used in such applications have customarily been proximity sensing devices of the type having a sensing coil at their extremities. In order to obtain interpretable results from such proximity sensors, the sensing coil must be accurately positioned with respect to the body of the apparatus and/or a known position of the surface being monitored. Where direct radial access to a journal probe is available in a fully assembled gas turbine, initial adjustment of a proximity probe, either on original apparatus installed during manufacture or a field installation to replace a defective probe, is relatively straightforward. For example, U.S. Pat. No. 4,018,083, of common assignee with the present invention, discloses a radial probe positioning apparatus in which a probe holder includes a stop for pre-positioning the probe a predetermined distance from a rotating shaft of a turbine.

When radial access is denied due to surrounding equipment such as housings etc., radial adjustment of a replacement probe may be feasible only through major disassembly of the gas turbine. The fundamental economic reason for employing such sensor probes is their value in providing material for an analysis of the condition of the gas turbine without major disassembly and the attendant costs. Such analysis is an on-going procedure throughout the life of the gas turbine and its value increases with the years of use. Unfortunately, proximity sensors are relatively subject to damage during manufacture of the apparatus and also are subject to field failure during use of the gas turbine. As a result, if access for replacement and adjustment of radial sensors is unavailable, after an extended period of use when their value becomes maximum, they can be in a failed condition and unavailable to provide the necessary input to the decision process without the unnecessary substantial disassembly of the gas turbine which they were intended to avoid.

One apparatus disclosed in U.S. Pat. No. 4,047,103 slides a sensor down a curved tube for eddy current measurement of position for measuring displacement of core components of a liquid metal nuclear reactor. Beyond positioning of a sensor along a curved connecting path, this invention offers little solution to the problems discussed in the preceding.

A further type of measurement includes the measurement of axial displacement of a thrust bearing. In some machinery, axial vibration is a factor requiring measurement. In other applications, the average axial position is of primary interest so that an assessment of lubricant film thickness can be obtained to evaluate possible thrust bearing damage due to excessive axial load or motion. In either case, a proximity probe must be positioned a predetermined distance from a nominal position of a target surface with the axis of the probe parallel to the axis of the apparatus. Due to manufacturing tolerances in the length relationships of the shaft, thrust bearing and compressors, the absolute positioning of a proximity sensor probe can not be established until the gas turbine is assembled and appropriate shims installed during manufacture. Once the final axial position of a thrust bearing is established, the proximity sensor must be adjusted to the required position. Adjustment of the proximity sensor customarily requires the disassembly of the bearing housing to gain access to the shaft collar and the thrust bearing.

Furthermore, during manufacturing, the proximity sensors are installed and their electrical cables for remote signal transmission are brought out of the bearing housing at the same time as the components of the apparatus are being assembled. The probe and its cable are relatively fragile elements which are at substantial risk during the assembly of the large, heavy and unwieldy components of the bearing housing assembly. Sufficient damage to the proximity sensor and/or its electrical cable, requiring an expensive disassembly, replacement and reassembly of the apparatus is required when damage occurs during manufacturing.

Even when relatively free access is available to the vicinity of the thrust bearing, replacement and adjustment of a proximity sensor is not necessarily possible. That is, direct axial access to the proximity sensor location is usually not provided and can not be obtained in a fully assembled equipment.

OBJECTS AND SUMMARY OF THE INVENTION

Accordingly, it is an object of the invention to provide a sensor positioning system which overcomes the drawbacks of the prior art.

It is a further object of the invention to provide a sensor positioning system which prepositions the sensing surface of a proximity sensor probe with respect to a target surface and permits installation of a replacement proximity probe accurately positioned according to the original adjustment.

It is a further object of the invention to provide guideway and into a prepositioning collar including a connecting device which is radially flexible but torsionally stiff so that the proximity probe can be inserted along the curving path and then rotated for final fitting into the prepositioning apparatus.

According to an aspect of the invention, there is provided a system for mounting a sensing probe a predetermined distance from a target surface to be monitored comprising, a probe adapter, the sensing probe being affixed at a forward end of the probe adapter, an intermediate portion of the probe adapter, the intermediate portion including means for providing lateral flexibility and torsional stiffness thereto, a quill positioned in a supporting member in a predetermined location with respect to the target surface, means for guiding the sensing probe from an entry location to the quill, abutment means on the quill and the probe adapter for establishing the predetermined distance and means at the entry location for producing abutment of the abutment means and for maintaining the abutment.

According to a feature of the invention, there is provided a probe mounting system for monitoring a radial position of a bearing journal with respect to a bearing housing comprising a quill threadably engaged through the housing and radially aligned with the radial position, means for locking the quill in a predetermined location, an entry fitting spaced apart from the quill and accessible from outside the bearing housing, a tubular guideway between the entry fitting and the quill, a probe adapter, a probe holder at a forward end of the probe adapter, a sensing probe in the probe holder, a first threaded portion on the probe holder, a second threaded portion in the quill adapted for threadable engagement with the first threaded portion, an abutment shoulder in the quill, a forward shoulder on the probe holder abuttable with abutment shoulder when the first and second threaded portions are engaged a predetermined amount whereby the sensing probe is positioned in a predetermined relationship to the journal bearing, an outboard end of the probe adapter extending outward from the entry fitting, a sealing portion of the probe adapter passing into the entry fitting, a tube between the probe holder and the sealing portion, the tube including means for imparting lateral bendability and torsional stiffness thereto, the lateral bendability being effective to permit the probe holder and the sensing probe to pass through the tubular guideway into the quill and the torsional stiffness being effective to permit rotation of the probe holder by rotating the outboard end whereby the first threaded portion is threaded into the second threaded portion to produce abutment between the abutment shoulder and the forward shoulder, and means in the entry fitting for clamping the sealing portion at least against rotation whereby the abutment is maintained.

According to a further feature of the invention, there is provided a probe mounting system for monitoring an axial position of a thrust bearing with respect to a bearing housing comprising a quill threadably engaged with the housing and axially aligned with the axial position, means for locking the quill in a predetermined location, an entry fitting spaced apart from the quill and accessible from outside the bearing housing, a tubular guideway between the entry fitting and the quill, a probe adapter, a probe holder at a forward end of the probe adapter, a sensing probe in the probe holder, a first threaded portion on the probe holder, a second threaded portion in the quill adapted for threadable engagement with the first threaded portion, an abutment shoulder in the quill, a forward shoulder on the probe holder abuttable with the abutment shoulder when the first and second threaded portions are engaged a predetermined amount whereby the sensing probe is positioned in a predetermined relationship to the thrust bearing, an outboard end of the probe adapter extending outward from the entry fitting, a sealing portion of the probe adapter passing into the entry fitting, a tube between the probe holder and the sealing portion, the tube including means for imparting lateral bendability and torsional stiffness thereto, the lateral bendability being effective to permit the probe holder and the sensing probe to pass through the tubular guideway into the quill and the torsional stiffness being effective to permit rotation of the probe holder by rotating the outboard end whereby the first threaded portion is threaded into the second threaded portion to produce abutment between the abutment shoulder and the forward shoulder, and means in the entry fitting for clamping the sealing portion at least against rotation whereby the abutment is maintained.

According to a further feature of the invention, there is provided, a probe adapter for positioning a sensor probe along a curved path to a predetermined position within an apparatus, comprising a probe holder at a first end of the probe adapter, the probe adapter including means for supporting a sensor probe at a first end thereof, a tube affixed at a first end to a second end of the probe holder, the tube including means for providing transverse flexibility and means for providing torsional stiffness, a rigid sealing tube affixed at a first end to a second end of the tube, a second end of the rigid sealing tube extending accessibly outward beyond the curving path, means on the second end for permitting enabling rotation of the rigid sealing tube about an axis thereof, first threaded means on the probe holder for engagement with second threaded means on the apparatus, and a forward shoulder on the probe holder abuttable against an abutment shoulder on the apparatus when the first and second threaded means are engaged to a predetermined value whereby the sensor probe is positioned in the predetermined position.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a side view of probe adapter according to an embodiment of the invention.

FIG. 6 is a cross sectional view taken along V—V of FIG. 2.

DETAILED DESCRIPTION OF THE PREFERRED EMBODIMENT

As previously noted, the present invention may be applied in suitable apparatus where position or vibration monitoring of one or more target surfaces is desired such as, for example, in pumps and motors etc. For concreteness of description, however, apparatus for measuring position or vibration of the target surfaces is described in the environment of a two-shaft, heavy-duty gas turbine which illustrates the problems and solutions achieved by the present invention.

Figure 1:
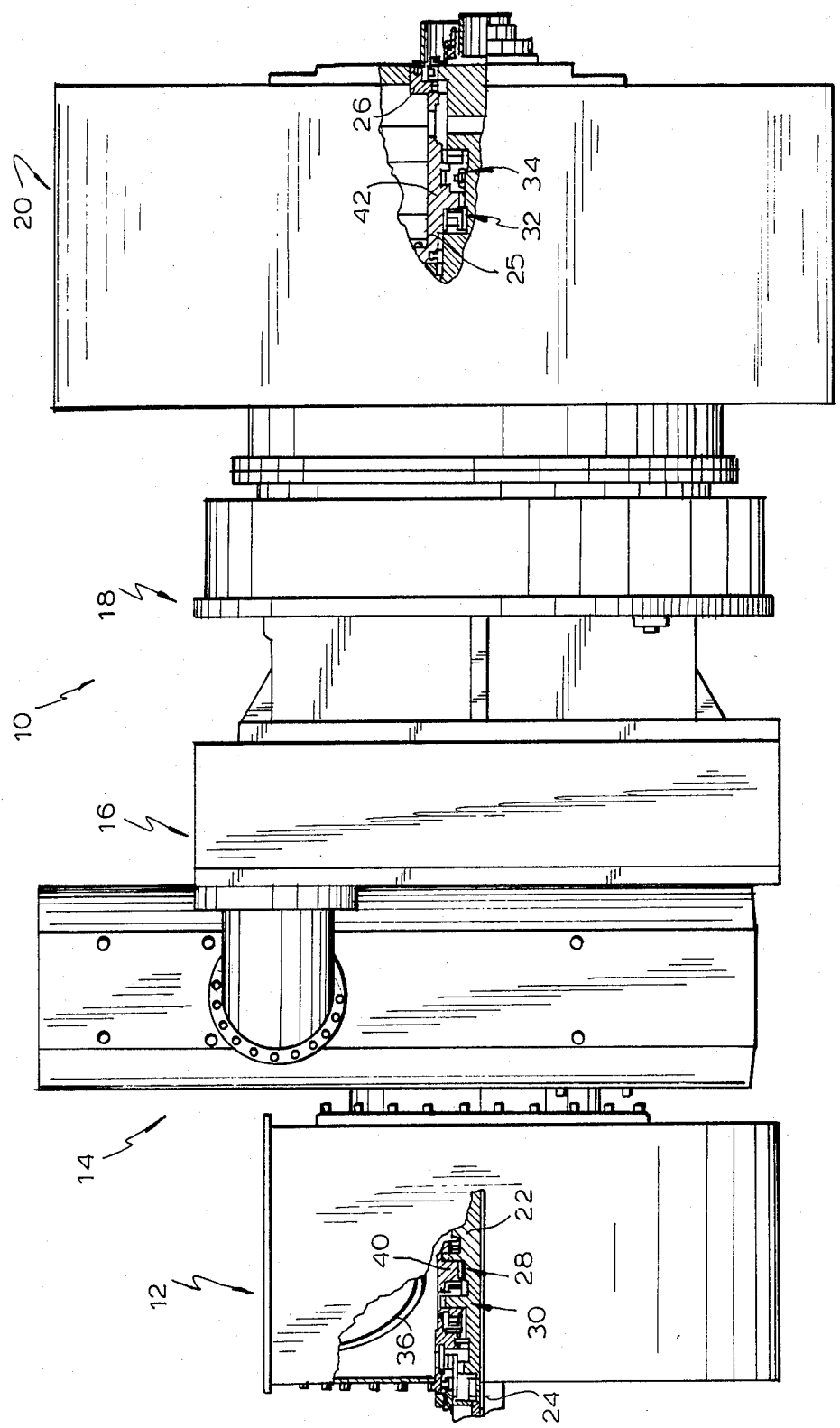
FIG. 1 is a side view of a gas turbine partially in section for identifying locations where the present invention may be employed.

Referring now to FIG. 1, there is shown, generally at 10, a gas turbine of the two-shaft type to which the present invention may be applied. Gas turbine 10 includes an air intake 12, a compressor region 14, a combustor region 16, a turbine region 18 and an exhaust region 20.

As is common in large gas turbines, turbine region 18 may include two or more stages with the first stage receiving the hottest and most energetic gas from combustor region 16 and rotating a first shaft 22 which drives an axial compressor in compressor region 14 as well as an accessory shaft 24. A second separately rotatable turbine stage in turbine region 18 may be, for example, a second stage turbine rotated by hot energetic gas leaving the first turbine stage and driving load through an output coupling 26. As is conventional, shafts are supported near their extremities by hydrodynamic bearings for permitting rotation and for resisting axial forces. A single shaft machine may have journal bearings near the ends of the shaft with a single thrust bearing and, in some cases, may have intermediate hournal bearings for supporting the center of the shaft and reducing whip.

In a two-shaft machine, each of the shafts must be separately supported and may require its own thrust bearing. The embodiment of FIG. 1, for example, includes an outboard journal bearing 28 supporting the outboard end of shaft 22 as well as a thrust bearing 30 which resists axial forces on shaft 22. An inboard bearing (not shown) supports the inboard end of shaft 22. An outboard journal bearing 32 supports the outboard end of an output shaft 25. A thrust bearing 34 resists axial forces on output shaft 25. As in the case of shaft 22, the inboard end of output shaft 25 is supported by an inboard bearing (not shown).

It will be noted that direct radial access to outboard journal bearing 28 on shaft 22 is interfered with by the presence of an obstruction 36 which, in the embodiment shown, consists of the inside shell of air intake 12. Insufficient clearance exists for removing and replacing a radially disposed sensor probe or for adjusting the radial position of such a probe with gas turbine 10 in the assembled condition. Thus, in order to replace a defective radially disposed sensor probe, at least the upper half of air intake 12 must be disassembled for access to the region radially outward of outboard journal bearing 28. In some equipments, an even more substantial disassembly is required including, for example, disassembly of the upper half of the axial compressor in compressor region 14. It will be noted that a larger radial clearance is available about outboard journal bearing 32 at the output end of gas turbine 10. In this case, a radially disposed proximity probe may be installed, replaced and adjusted without requiring assistance from the present invention. As will become clearer from a further reading of this detailed description, a user may wish to take advantage of the added convenience of the present invention for positioning a sensor probe even when, as in the output end of gas turbine, adequate radial clearance is available.

In the case of thrust bearings 30 and 34, necessary bearing housings 40 and 42 prevent direct access to sensor probes aligned parallel to the axis of the apparatus even when ample clearance is available. Thus, if a sensor fails after installation and, as may be most troublesome, after an extended period of field operation, major disassembly of gas turbine 10 may be required to make direct physical measurements or to replace the sensor probe.

From the standpoint of the present invention, a probe mounting system for either end of gas turbine 10 is functionally identical. Thus, only a probe mounting system for use at outboard journal bearing 28 and thrust bearing 30 at the left of gas turbine 10 in FIG. 1 is described in detail.

Figure 2:
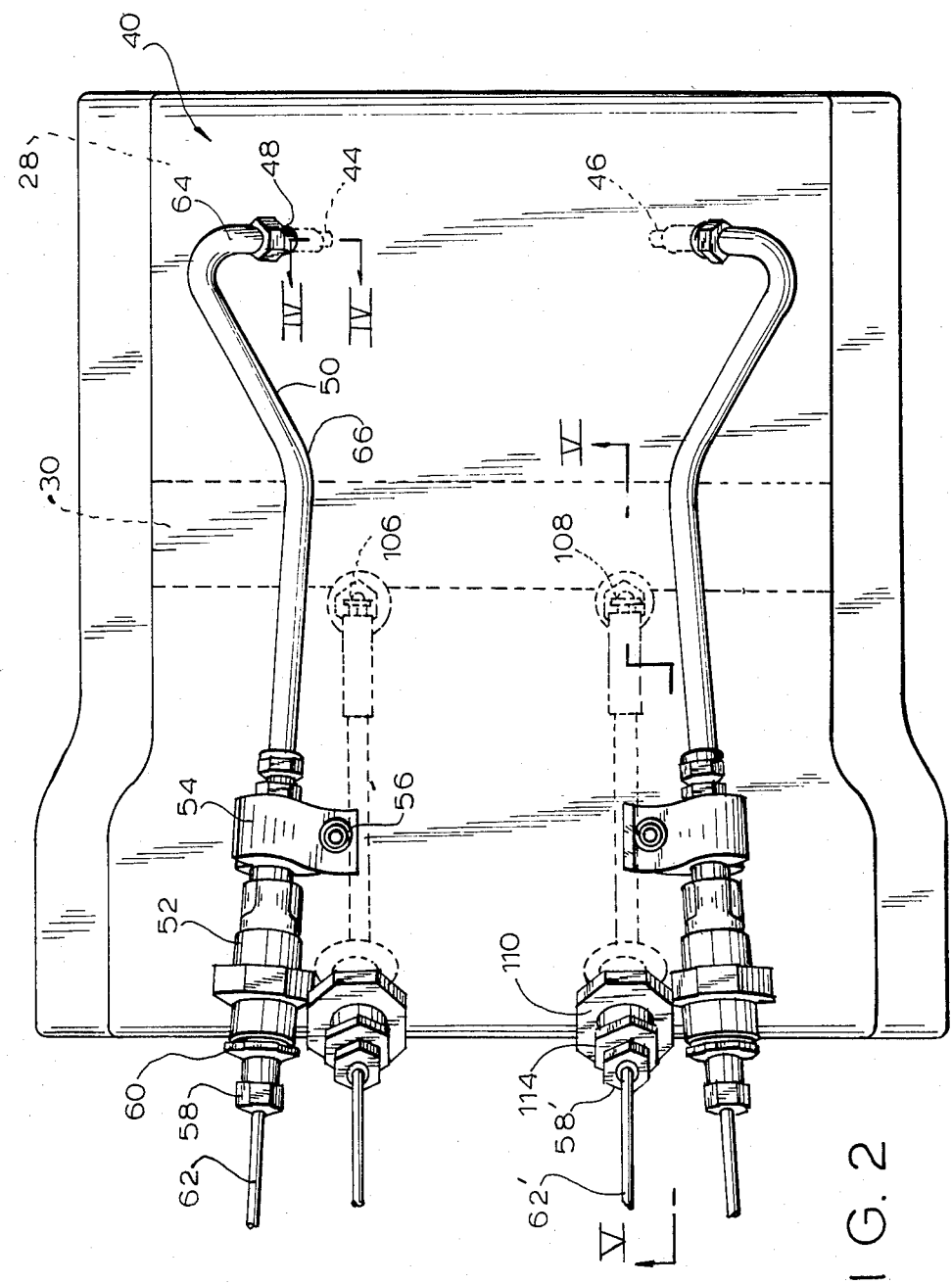
FIG. 2 is a top view of a bearing housing of FIG. 1 showing the general location of sensor probes and guideways according to an embodiment of the invention.

Referring now to FIG. 2, a top view of bearing housing 40 is shown with thrust bearing 30 indicated in dashed line and the location of outboard journal bearing 28 indicated by the reference designator. Since outboard journal bearing 28 is obstructed, sensor probes 44 and 46, disposed 90 degrees apart about outboard journal bearing 28 cannot be reached directly after the apparatus is fully assembled.

The probe mounting system for sensor probes 44 and 46 are functionally identical and therefore only the probe mounting system for sensor probe 44 is further detailed.

A prepositioning quill 48 is affixed through bearing housing 40 by any convenient means such as by threaded connection. Quill 48, to be further described hereinafter, aligns the axis of sensor probe 44 at a predetermined position with respect to outboard journal bearing 28.

A rigid curving guideway 50 is connected to an outer end of quill at one of its ends and to an entry fitting 52 at the other of its ends. A mounting block 54 secures the end of guideway 50 adjacent entry fitting 52 to bearing housing 40 by any convenient means such as, for example, by bolts 56.

An outboard end 58 of a sensor probe adapter, to be described hereinafter, passes through a gland-type seal fitting 60. Seal fitting 60 prevents leakage of lubricant around the probe adapter and also locks the probe adapter in rotational position to maintain the location of sensor probe 44. A probe signal wire 62 emerges from outboard end 58. Outboard end 58 may conveniently have flats machined or otherwise formed thereon for accommodating a wrench for installation and removal of sensor probe 44.

Guideway 50 consists of a hollow tube of any convenient material such as, for example, stainless steel, including one or more smooth bends such as for example, two smooth bends 64 and 66. Bends 64 and 66 maintain a generally circular cross section of guideway 50 so that insertion of probe 44 and the necessary parts of the probe adapter are not interfered with. Within this constraint, guideway 50 can be of any length and shape necessary to give access from entry fitting 52 to quill 48.

Referring now to FIG. 3, a probe adapter 68 includes outboard end 58 affixed to a rigid sealing tube 70. The connection between these two elements may be of any convenient type however, in the preferred embodiment, welding or brazing is preferred. Sealing tube 70 provides a sealing surface against which seal fitting 60 (FIG. 2) may bear. A radially flexible but torsionally stiff braid-covered flexible tube 72 extends forward from sealing tube 70. An interior 74 of flexible tube 72 may be of any convenient material capable of providing fluid tight sealing between the exterior and probe signal wire 62 inside. A metallic braid 76 on the exterior of flexible tube 72 provides substantial torsional stiffness. Flexible tube 72 is affixed to sealing tube 70 by any convenient means such as, for example, by brazing metallic braid 76 to sealing tube 70.

A probe holder 78 at the forward end of probe adapter 68 includes collar 80 affixed, for example, by brazing to flexible tube 72. A forward end of probe holder 78 includes a fitting 82 which is preferably externally threaded. A plastic cap 84 covers and protects the end of sensor probe 44 as well as encourages free travel of the leading end of probe adapter 68 through the curving path provided by guideway 50 (FIG. 2).

Figure 4:
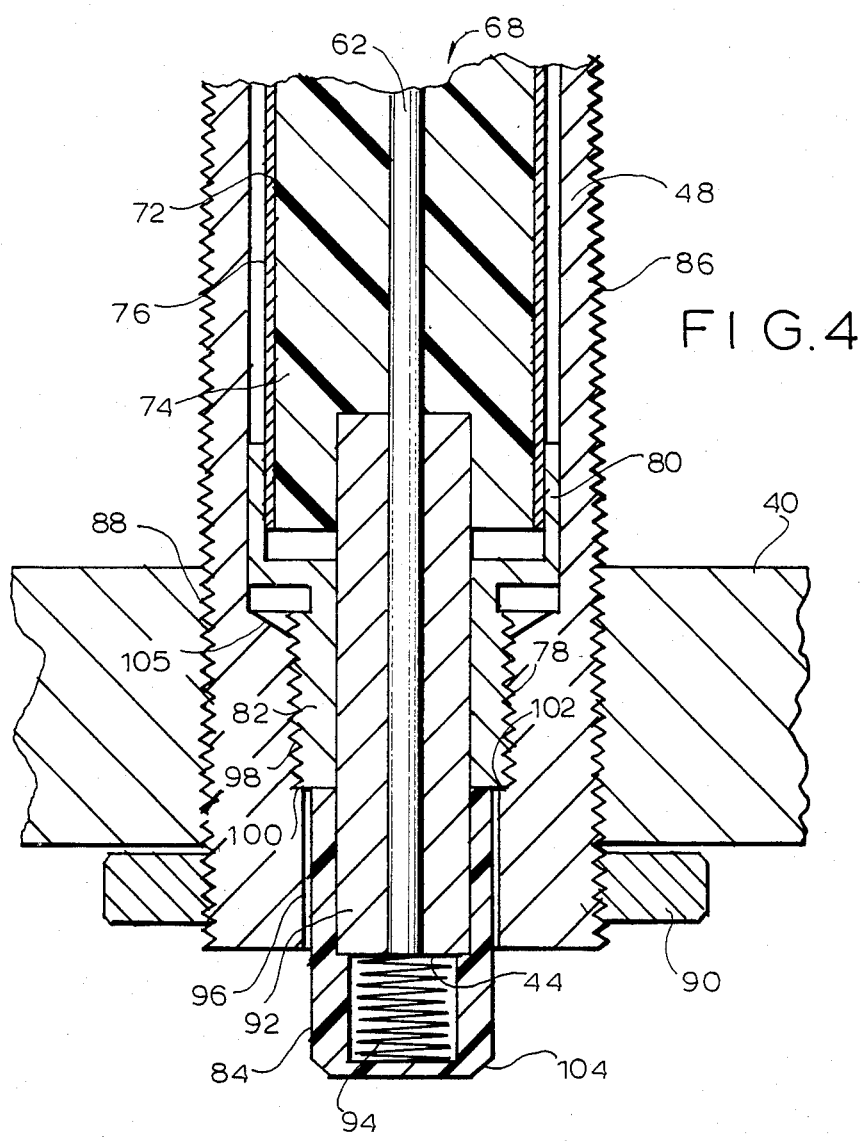
FIG. 4 is a cross sectional view taken along IV—IV of FIG. 3.

Referring now to FIG. 4, quill 48 includes external threading 86 for engagement with inside threading in a hole 88 through housing 40. A jam nut 90 locks quill 48 in place once its final position is established.

Sensor probe 44 is seen to consist of a sensor probe body 92, conventionally of metal, affixed inside probe holder 78. Sensor probe 44 includes a sensing coil 94 at its forward end.

Quill 48 includes a bore 96 through which an extremity of sensor probe 44, protected by plactic cap 84, passes. A counter bore 98 has internal threading which engages external threading on fitting 82. Counter bore 98 terminates in an abutment shoulder 100 which butts a forward shoulder 102. When abutment shoulder 100 and forward shoulder 102 are in contact, sensing coil 94 is positioned in a predetermined location rigidly fixed by the dimensions of probe adapter 68 and the radial location in which sensor probe 44 is locked by jam nut 90. Thus, when quill 48 is locked in its operating position during manufacture, abutment shoulder 100 is permanently prepositioned so that any sensor probe 44 inserted using a probe adapter 68 according to the present invention is accurately positioned in the design location for optimum results.

Plastic cap 84 preferably includes a chamfer or bevel 104 to aid in guiding the forward end of probe adapter 68 during insertion and to avoid hanging up on shoulders such as, for example, abutment shoulder 100. Any projections in its path which may permit probe adapter 68 to become hung up during insertion are preferably bevelled such as at 105 in quill 48.

Figure 5:
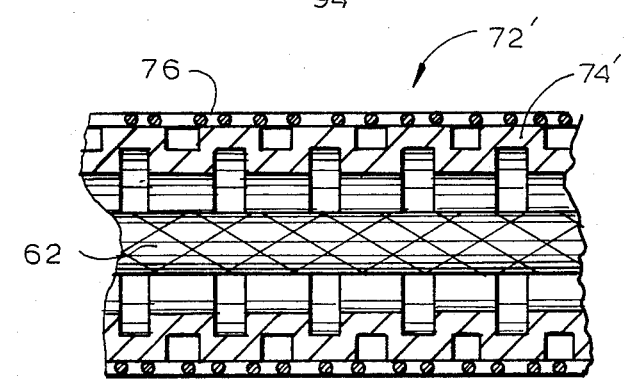
FIG. 5 is a cross section of an all-metal flexible tube which may be employed in a probe adapter of FIG. 3.

Flexible tube 72 is shown hatched in FIG. 4 to indicate plastic material in interior 74 such as, for example, rubber. In some gas turbine applications, the temperatures encountered exceed those which may be withstood by available plastic or rubber materials. For such applications an all-metal flexible tube 72', shown in FIG. 5 may be employed and this is, in fact, the preferred embodiment. A conventional metallic inner member 74' is spirally corrugated as shown to provide lateral flexibility and torsional stiffness. A metallic braid 76 covers and protects the exterior. Due to the corrugations, substantial lateral flexibility and torsional stiffness is provided while full fluid and pressure protection is achieved for probe signal wire 62.

Returning now to FIG. 2, a pair of sensor probes 106 and 108 are positioned with their axes parallel to the axis of the gas turbine in an operative position adjacent thrust bearing 30. In applications where there is no need to measure axial vibration, but instead, measurement is made only of an average axial position of thrust bearing 30, there is no need for having a pair of sensor probes 106 and 108 for this application. However, it has been the practice to include a pair of such sensor probes as a measure of redundancy and this practice is reflected in the embodiment of FIG. 2. With the present invention offering the opportunity to easily and accurately change a sensor probe, it may be desirable to reduce the number of axial sensor probes to one.

An entry fitting 110 provides access for an outboard end 58' of a probe adapter which terminates in sensor probe 108. A seal fitting 114 seals the probe adapter against lubricant leakage and also prevents loosening of sensor probe 108 as will be described. Probe signal wire 62' emerges from outboard end 58' for connection to external equipment (not shown) of a conventional type.

The probe adapters serving sensor probes 106 and 108 are identical to probe adapter 68 (FIG. 3) previously described except for possible differences in dimension. Thus, in the description which follows, a detailed description of the probe adapters for sensor probes 106 and 108 is omitted and, where referred to, they are identified by the same reference designators as were used in describing probe adapter 68 except that primed numerals will be employed.

Referring now to FIG. 6, entry fitting 110 is affixed to bearing housing 40 by threading into a hole 118 which is angled to minimize the angular bend required of the probe adapter. In order to enable angular entry, an angled well 120 is bored or machined in bearing housing 40 with hole 118 bored and tapped in the base of angled well 120. A one-piece curving guideway 122 passes through any convenient interference-free path within bearing housing 40 to a sensor support block 124 which may be affixed to the inside of bearing housing 40 by any convenient means such as by screws 126. Optionally, locating pins 128 may be employed to assist in alignment of sensor support block 124 and assist in maintaining its alignment once installed.

Figure 7:
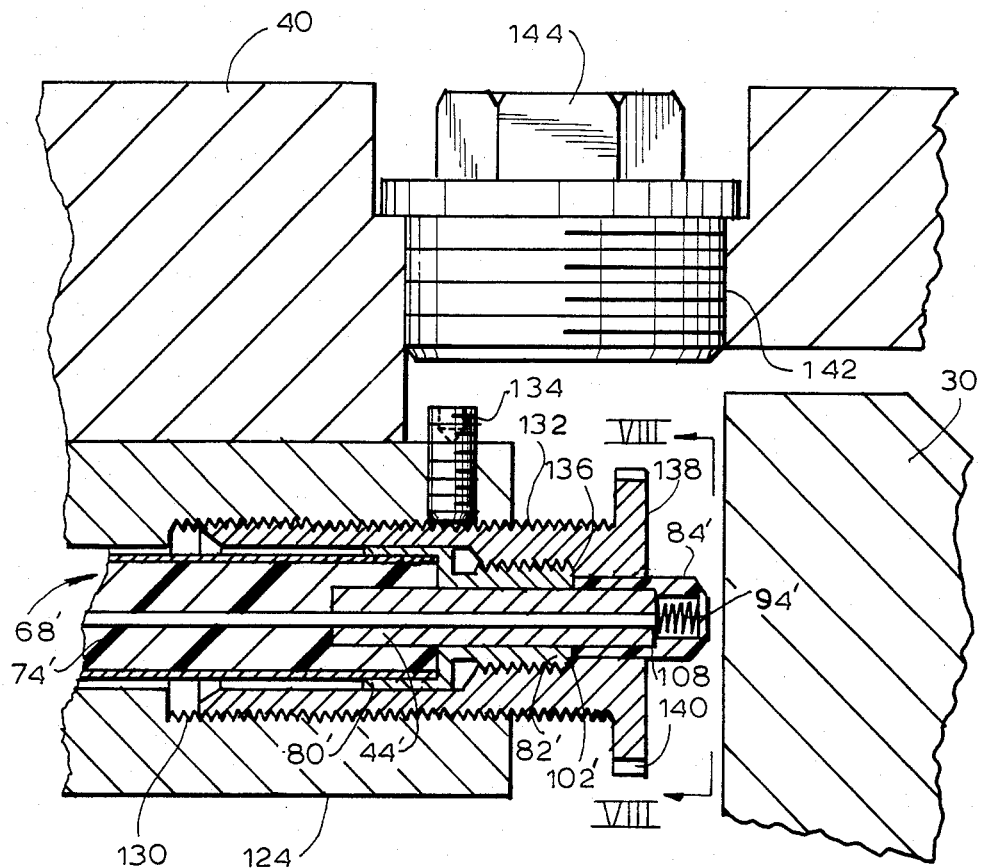
FIG. 7 is a cross sectional view of a portion of FIG. 6 enlarged for clarity of description.

Referring now to FIG. 7, sensor support block 124 includes a threaded counterbore 130 at its extremity closer to thrust bearing 30. An externally threaded adjustment sleeve 132 is threaded into threaded counterbore 130 and may be locked in place by any convenient means such as by a setscrew 134. Adjustment sleeve 132 includes an abutment shoulder 136 against which a forward shoulder 102' abuts in its operative position. A star wheel 138 is preferably integrally formed at the forward end of adjustment sleeve 132.

Figure 8:
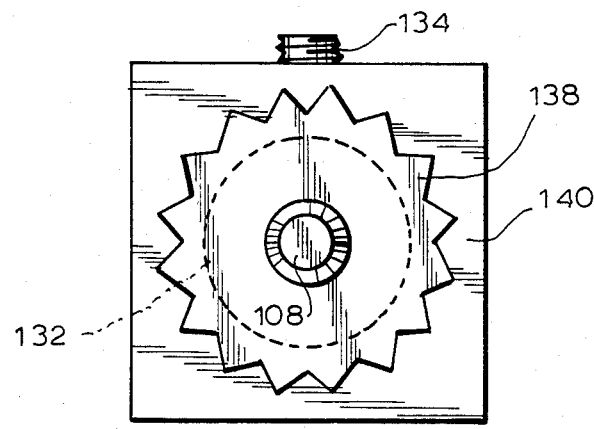
FIG. 8 is a view taken along VIII—VIII of FIG. 7.

Referring momentarily to FIG. 8, star wheel 138 is seen to contain relatively deep corrugations 140 in its perimeter which permit rotation of star wheel 138 and the attached adjustment sleeve 132 using an appropriate tool. Once the proper position is obtained, adjustment sleeve 132 may be locked in position using setscrew 134.

An adjustment opening 142 through bearing housing 40 provides access to star wheel 138 and setscrew 134 after bearing housing 40 is fully installed as is necessary for proper adjustment of the operating position of sensor probe 108 with respect to a target surface on thrust bearing 30. A plug 144 threads into adjustment opening 142 for sealing adjustment opening 142 once adjustment is completed.

During manufacture of the apparatus, once the operational position of thrust bearing 30 has been determined, adjustment sleeve 132 can be adjusted toward or away from a target surface on thrust bearing 30 by adjusting star wheel 138 using a tool such as a screwdriver entered through adjustment opening 142. Once adjustment sleeve 132 is in the correct location to position sensor probe 108 the required distance from thrust bearing 30, setscrew 134 is tightened with a screwdriver admitted through adjustment opening 142. This adjustment should be permanent for the lift of the apparatus and thus may be locked by any convenient means. Once the proper adjustment is found, sensor probe 108, either installed during manufacture of the equipment or installed during replacement of a defective probe, is always positioned in the same correct location established by abutment shoulder 136 and forward shoulder 102'.

Returning now to FIG. 6, guideway 122 is shown with a single large-radius curve therein to pass from entry fitting 110 to sensor support block 124. If necessary to find an appropriate interference free path within bearing housing 40, a more complex pathway may be chosen provided that the curvature of bends do not become so acute that the flexible portion of probe adapter 68' (see FIG. 3) is unable to negotiate them.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A system for mounting a sensing probe a predetermined distance from a target surface to be monitored comprising:
   a probe adapter;
   said sensing probe being affixed at a forward end of said probe adapter;
   an intermediate portion of said probe adapter;
   said intermediate portion including means for providing lateral flexibility and torsional stiffness thereto;
   a quill positioned in a supporting member in a predetermined location with respect to said target surface;
   means for guiding said sensing probe from an entry location to said quill;
   said means for guiding including at least one smooth bend therein;
   wherein said means for providing lateral flexibility and torsional stiffness provides sufficient lateral flexibility and torsional stiffness to permit said probe adapter to traverse said means for guiding between said entry location and said quill, past said at least one smooth bend therein;
   abutment means on said quill and said probe adapter for establishing said predetermined distance; and
   means at said entry location for producing abutment of said abutment means and for maintaining said abutment.

2. A system for mounting a sensing probe a predetermined distance from a target surface to be monitored comprising:
   a probe adapter;
   said sensing probe being affixed at a forward end of said probe adapter;
   an intermediate portion of said probe adapter;
   said intermediate portion including means for providing lateral flexibility and torsional stiffness thereto;
   a quill positioned in a supporting member in a predetermined location with respect to said target surface;
   means for guiding said sensing probe from an entry location to said quill;
   abutment means on said quill and said probe adapter for establishing said predetermined distance;
   means at said entry location for producing abutment of said abutment means and for maintaining said abutment; and
   said means for providing lateral flexibility and torsional stiffness including an interior containing resilient material and a metallic braided material on its exterior.

3. A system according to claim 1 wherein said means for providing lateral flexibility and torsional stiffness includes a corrugated metallic tube.

4. A system according to claim 1 wherein said predetermined location includes a location radially outward of a journal bearing with an axis of said sensing probe radially disposed.

5. A system according to claim 1 wherein said predetermined location includes a location axially spaced from a thrust bearing with an axis of said sensing probe parallel to an axis of said thrust bearing.

6. A system for mounting a sensing probe a predetermined distance from a target surface to be monitored comprising:
   a probe adapter;
   said sensing probe being affixed at a forward end of said probe adapter;
   an intermediate portion of said probe adapter;
   said intermediate portion including means for providing lateral flexibility and torsional stiffness thereto;
   a quill positioned in a supporting member in a predetermined location with respect to said target surface;
   means for guiding said sensing probe from an entry location to said quill;
   abutment means on said quill and said probe adapter for establishing said predetermined distance;
   means at said entry location for producing abutment of said abutment means and for maintaining said abutment; and
   said probe adapter including a plastic cap covering a forward end of said sensing probe, said plastic cap being effective for protecting said sensing probe and for guiding said forward end through said means for guiding and into said quill.

7. A system for mounting a sensing probe a predetermined distance from a target surface to be monitored comprising:
   a probe adapter;
   said sensing probe being affixed at a forward end of said probe adapter;
   an intermediate portion of said probe adapter;
   said intermediate portion including means for providing lateral flexibility and torsional stiffness thereto;
   a quill positioned in a supporting member in a predetermined location with respect to said target surface;
   means for guiding said sensing probe from an entry location to said quill;
   abutment means on said quill and said probe adapter for establishing said predetermined distance;
   means at said entry location for producing abutment of said abutment means and for maintaining said abutment; and said means at said entry location including an outboard end of said probe adapter extending outward from said means for guiding, a sealing tube on said probe adapter between said intermediate portion and said outboard end, a sealing fitting at said entry location, said sealing fitting being tightenable to lock said sealing tube in at least a tangential location whereby said abutment is maintained.

8. A system according to claim 1 wherein said quill includes means for adjusting said predetermined location and means for locking said quill in said predetermined location.

9. A system for mounting a sensing probe a predetermined distance from a target surface to be monitored comprising:
a probe adapter;
said sensing probe being affixed at a forward end of said probe adapter;
an intermediate portion of said probe adapter;
said intermediate portion including means for providing lateral flexibility and torsional stiffness thereto;
a quill positioned in a supporting member in a predetermined location with respect to said target surface;
means for guiding said sensing probe from an entry location to said quill;
abutment means on said quill and said probe adapter for establishing said predetermined distance;
means at said entry location for producing abutment of said abutment means and for maintaining said abutment;
said quill including means for adjusting said predetermined location and means for locking said quill in said predetermined location; and
said means for adjusting including a threaded engagement between said quill and said supporting member.

10. A system according to claim 9 wherein said means for locking includes a jam nut threaded on said quill and tightenable against said supporting member to lock said quill in said predetermined location.

11. A system according to claim 9 wherein said means for adjusting includes a star wheel affixed to said quill.

12. A system according to claim 11 wherein said means for locking includes a setscrew in said supporting member engagable with a surface of said quill for locking said quill in said predetermined location.

13. A system according to claim 12 wherein said means for adjusting and means for locking further include at least one closeable adjustment opening through said supporting member, said at least one adjustment opening providing access to said star wheel and said set screw for adjustment thereof.

14. A system according to claim 1 wherein said means for guiding includes a guide tube extending between said entry location and said quill.

15. A system according to claim 14 wherein said guide tube includes at least one curve.

16. A system for mounting a sensing probe a predetermined distance from a target surface to be monitored comprising:
a probe adapter;
said sensing probe being affixed at a forward end of said probe adapter;
an intermediate portion of said probe adapter;
said intermediate portion including means for providing lateral flexibility and torsional stiffness thereto;
a quill positioned in a supporting member in a predetermined location with respect to said target surface;
means for guiding said sensing probe from an entry location to said quill;
abutment means on said quill and said probe adapter for establishing said predetermined distance;
means at said entry location for producing abutment of said abutment means and for maintaining said abutment; and
said quill includes a first threaded portion and said probe adapter including a second threaded portion engageable in said first threaded portion, said abutment means includes a forward shoulder on said probe adapter and an abutment shoulder on said quill, said forward shoulder being effective to abut said abutment shoulder when said second threaded portion is engaged a predetermined amount with said first threaded portion.

17. A probe mounting system for monitoring a radial position of a journal bearing with respect to a bearing housing comprising:
a quill threadably engaged through said housing and radially aligned with said radial position;
means for locking said quill in a predetermined location;
an entry fitting spaced apart from said quill and accessible from outside said bearing housing;
a tubular guideway between said entry fitting and said quill;
a probe adapter;
a probe holder at a forward end of said probe adapter;
a sensing probe in said probe holder;
a first threaded portion on said probe holder;
a second threaded portion in said quill adapted for threadable engagement with said first threaded portion;
an abutment shoulder in said quill;
a forward shoulder on said probe holder abuttable with said abutment shoulder when said first and second threaded portions are engaged a predetermined amount whereby said sensing probe is positioned in a predetermined relationship to said journal bearing;
an outboard end of said probe adapter extending outward from said entry fitting;
a sealing portion of said probe adapter passing into said entry fitting;
a tube between said probe holder and said sealing portion;
said tube including means for imparting lateral bendability and torsional stiffness thereto, said lateral bendability being effective to permit said probe holder and said sensing probe to pass through said tubular guideway into said quill and said torsional stiffness being effective to permit rotation of said probe holder by rotating said outboard end whereby said first threaded portion is threaded into said second threaded portion to produce abutment between said abutment shoulder and said forward shoulder; and
means in said entry fitting for clamping said sealing portion at least against rotation whereby said abutment is maintained.

18. A system according to claim 17 wherein said means for locking includes a jam nut threadable onto said quill and tightenable into a locking position against said bearing housing.

19. A probe mounting system for monitoring an axial position of a thrust bearing with respect to a bearing housing comprising:
- a quill threadably engaged with said housing and axially aligned with said axial position;
- means for locking said quill in a predetermined location;
- an entry fitting spaced apart from said quill and accessible from outside said bearing housing;
- a tubular guideway between said entry fitting and said quill;
- a probe adapter;
- a probe holder at a forward end of said probe adapter;
- a sensing probe in said probe holder;
- a first threaded portion on said probe holder;
- a second threaded portion in said quill adapted for threadable engagement with said first threaded portion;
- an abutment shoulder in said quill;
- a forward shoulder on said probe holder abuttable with said abutment shoulder when said first and second threaded portions are engaged a predetermined amount whereby said sensing probe is positioned in a predetermined relationship to said thrust bearing;
- an outboard end of said probe adapter extending outward from said entry fitting;
- a sealing portion of said probe adapter passing into said entry fitting;
- a tube between said probe holder and said sealing portion;
- said tube including means for imparting lateral bendability and torsional stiffness thereto, said lateral bendability being effective to permit said probe holder and said sensing probe to pass through said tubular guideway into said quill and said torsional stiffness being effective to permit rotation of said probe holder by rotating said outboard end whereby said first threaded portion is threaded into said second threaded portion to produce abutment between said abutment shoulder and said forward shoulder; and
- means in said entry fitting for clamping said sealing portion at least against rotation whereby said abutment is maintained.

20. A system according to claim 19 wherein said quill fully contained within said housing.

21. A system according to claim 20 wherein said means for locking includes a star wheel affixed to said quill, a setscrew in said housing, said setscrew being adjustable into locking contact with said quill, and at least one sealable opening through said housing, said at least one sealable opening being effective to provide adjustment access through said housing to said star wheel and said setscrew whereby said predetermined position can be adjusted from outside said bearing housing.

22. A probe adapter for positioning a sensor probe along a curved path to a predetermined position within an apparatus, comprising:
- a probe holder at a first end of said probe adapter;
- said probe adapter including means for supporting a sensor probe at a first end thereof;
- a tube affixed at a first end to a second end of said probe holder;
- said tube including means for providing transverse flexibility and means for providing torsional stiffness;
- a rigid sealing tube affixed at a first end to a second end of said tube;
- a second end of said rigid sealing tube extending accessibly outward beyond said curving path;
- means on said second end for permitting enabling rotation of said rigid sealing tube about an axis thereof;
- first threaded means on said probe holder for engagement with second threaded means on said apparatus; and
- a forward shoulder on said probe holder abuttable against an abutment shoulder on said apparatus when said first and second threaded means are engaged to a predetermined value whereby said sensor probe is positioned in said predetermined position.

23. A system according to claim 1, wherein said means for maintaining said abutment includes means disposed near said forward end for releasably locking said quill and said probe adapter thereby establishing said predetermined distance.

* * * * *